May 23, 1961   F. DEL CHIOCCA   2,985,821
COMBINATION VALVE AND CONDUCTIVITY ASSEMBLY
Filed Nov. 6, 1956                                     2 Sheets-Sheet 1
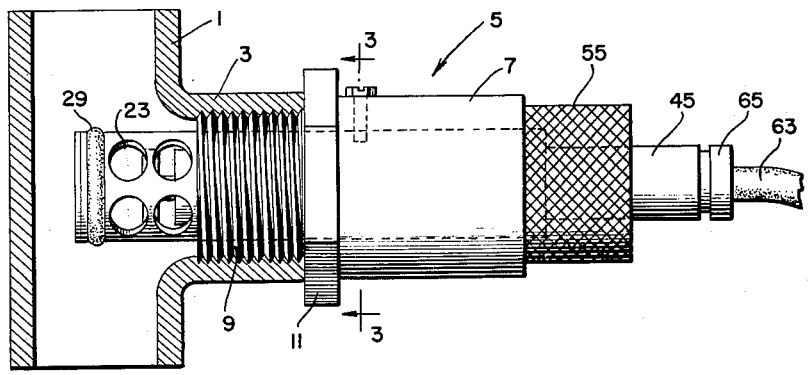
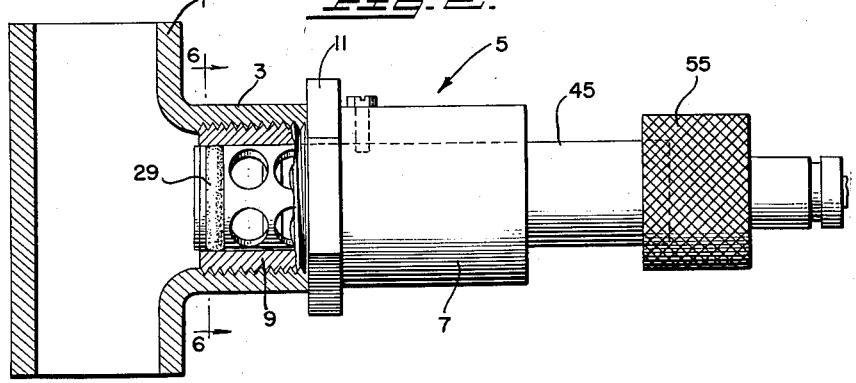
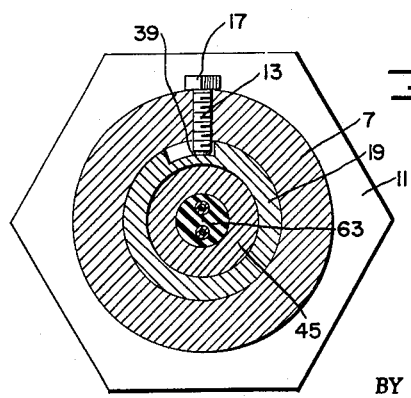
INVENTOR
Frank Del Chiocca
BY
Peck & Peck
ATTORNEY May 23, 1961  F. DEL CHIOCCA  2,985,821
COMBINATION VALVE AND CONDUCTIVITY ASSEMBLY
Filed Nov. 6, 1956  2 Sheets-Sheet 2
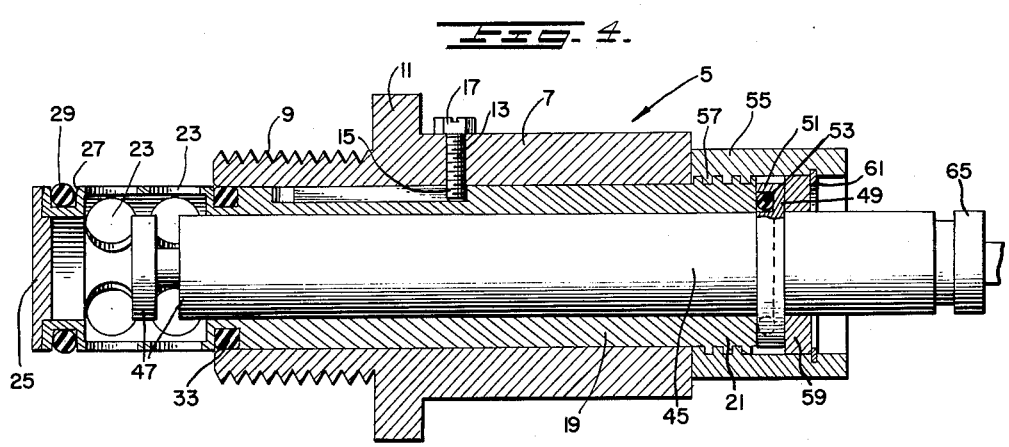
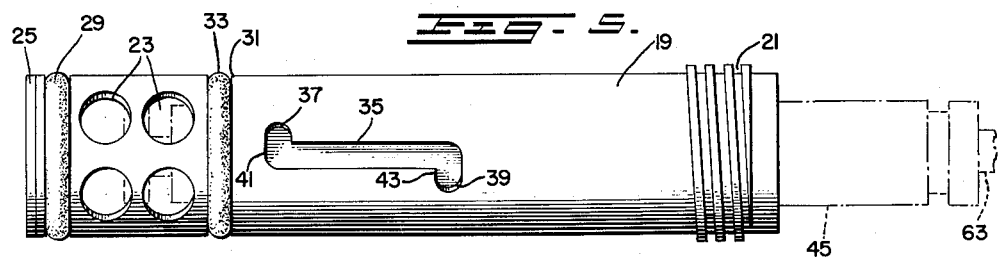
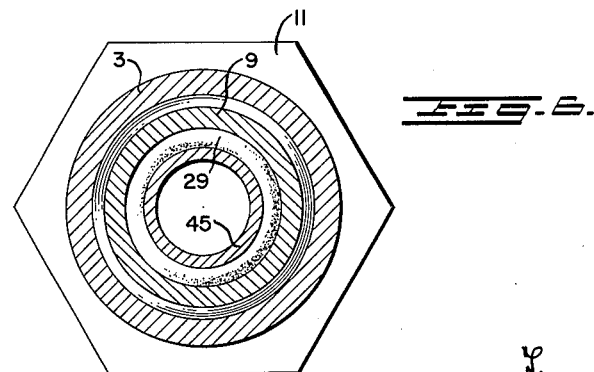
INVENTOR
Frank del Chiocca
BY Peck+Peck
ATTORNEY United States Patent Office 2,985,821
Patented May 23, 1961

2,985,821

COMBINATION VALVE AND CONDUCTIVITY ASSEMBLY

Frank Del Chiocca, New York, N.Y., assignor to McNab, Incorporated, New York, N.Y., a corporation of New York Filed Nov. 6, 1956, Ser. No. 620,659

1 Claim. (Cl. 324—30)

This invention relates broadly to the art of valves for use in electrical systems for measuring and indicating the concentration of electrical conductive impurities in liquids and in its more specific aspects it relates to a simple and economically produced assembly for mounting a conductivity cell in operative position with the electrodes thereof projected into a liquid flow conduit or a tank or the like of liquid through an opening in the conduit or tank for immersion of the electrodes within the liquid, and provides mounting means including a valve whereby the conductivity cell may be retracted from operative position within the liquid for replacement and/or repair while at the same time the valve is actuated to close the opening in the conduit or tank in order to prevent escape of liquid therefrom; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

The conductivity cells with which my invention particularly pertains are adapted to test the concentration of electrical conductive impurities within a liquid flowing within a conduit, or in a liquid contained in a tank or the like. Among other uses, cells of this character are advantageously used in measuring and indicating the salt concentration in water flowing through conduits to boilers, engines, condensers and the like on ships. It is conventional practice to provide an opening in the wall of the liquid flow conduit, or of a tank, in which the housing for the conductivity cell is fixed in such manner that the electrodes of the cell are disposed within the liquid under test. In actual practice it has been found that the electrodes must be replaced or cleaned or repairs made thereto or to the cell at relatively frequent intervals as they become corroded and otherwise incapable of properly performing their measuring function. When it is necessary to replace or otherwise repair the electrodes or any other elements or parts of the conductivity cell, it will be obvious that it is essential to withdraw the conductivity cell from the opening through which it projects into the interior of the liquid flow line or the liquid tank. Since most of the liquids being tested are under considerable pressure, and in any event, it will be evident that some means must be provided for either closing the opening in the liquid flow conduit or tank immediately following retraction and removal of the conductivity cell or of providing some means either directly in the opening or adjacent thereto for preventing escape of the liquid from the conduit or tank.

In this embodiment of my invention I have illustrated and described an adaption of my invention to liquid flow conduits, but it is to be understood that it is fully within my contemplation to use this valve assembly in tanks or the like where the liquid to be tested is stored.

It has been more or less conventional practice to movably mount the conductivity cell and its assembly within an elongated housing which is fixedly mounted on the liquid flow conduit at the opening thereof and to provide this housing with a gate valve or the like. In such arrangements the conductivity cell is removably mounted in the housing in sealed relation with respect thereto so there will be no escape of liquid when the cell is operatively fixed in the housing. This has necessitated the utilization of a variety of sealing rings, retaining elements and the like.

It has been one of my primary purposes in designing a valve and conductivity cell assembly to eliminate the gate valve of prior art assemblies and to provide an integrated much more simplified and efficient assembly wherein the valve structure for the opening in the conduit is of such form that it actually mounts and carries the conductivity cell assembly.

Due to this unique combination of valve and conductivity cell wherein the prior art gate valve is eliminated from the combination, damage to the cell caused by closing the gate valve before sufficient withdrawal of the conductivity cell from the housing is prevented.

In apparatus of this character of which I am aware, the removal of a conductivity cell for replacement or repair of parts thereof constitutes a considerable task for it is necessary to release the various sealing means mentioned above so that the conductivity cell and its assembly may be withdrawn from the housing, and in this operation it is necessary to actuate the gate valve in the housing as soon as the cell has been withdrawn past the point in the housing where the gate valve is positioned in order to prevent the escape of liquid rearwardly from the housing. It will be appreciated that this type of mounting and the assembly arrangement for a conductivity cell is inherently complex and disadvantageous in the consumption of considerable time and effort in the operation of removing the cell from its mounted operative position. It is also a fact that the present known arrangements for mounting a conductivity cell in operative position as described is expensive not only in time required to assemble and disassemble but also in the number of parts and elements required for the assembly.

It has been one of my major purposes in evolving this invention to overcome the complexities and disadvantages which are inherent in such mounting arrangements of which I now know. The invention I am about to describe provides a simple mounting assembly for a conductivity cell which may be assembled and disassembled with facility and which insures against the escape of the liquid which is flowing in the conduit and which is under test.

In overcoming the disadvantages of structure and operation of mounting assemblies and arrangements for conductivity cells in liquid flow conduits I have eliminated many of the parts and elements previously used and have provided assembly arrangements which include a valve, which reduces the number of manual steps and operations to remove the cell from operative position in the assembly or to associate it with the assembly into operative position. In prior assemblies of which I know a considerable number of manipulative operations are necessary to remove or replace the cell.

I am aware that combination valve and conductivity cells having the above described advantages and characteristics have been devised, however while certain of them are successful in accomplishing the purposes for which designed they are expensive to produce and are relatively complex structurally and operationally.

Thus, it is one of my purposes to provide a combination valve and conductivity cell having the above mentioned features which is economical to produce and simple to actuate.

This invention involves generally a valve which is in the nature of a carrier for the conductivity cell for operation to dispose the cell in position immersed in the liquid to be tested and in retracted position withdrawn from the liquid and closing the opening in the conduit or tank for removal of the cell for replacement or repair. Such valves of which I am aware usually involve means such as rotary nuts or the like for causing reciprocation of the valve carrier to and from projected position. In order to simplify and reduce the costs of manufacture of such valves I have evolved one which eliminates the need for a rotary nut and the structure accompanying such nut to cause operation of the valve and instead I have provided a push pull valve assembly which is simple to manufacture and easy to operate.

In a valve of the type of this invention it is desirable to provide some means so that when the valve is in projected operative position it will be releasably locked in such position and when it is in retracted inoperative position it will be releasably locked in such position. Such locking means is desirable to banish the possibility of the valve being closed by the pressure of the fluid being tested or of being accidentally closed. It also serves to eliminate the possibility of the valve being opened by the suction which may occur in the liquid flow line or of being accidentally opened in some other manner. If the valve is opened when the conductivity cell is removed the liquid will escape.

I have provided a valve of this type which when opened may be releasably locked in open position by a simple manipulation and when it is closed it may be releasably locked in closed position by a simple manipulation. It is equally true that the valve may be unlocked from either opened or closed position by a simple manipulation.

I have accomplished these purposes without requiring the use of any tools whatsoever in opening and closing and releasably locking the valve. This is done in a fully manual manner by the operator of the valve.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in side elevation with certain parts in section of the combination valve and conductivity cell assembly in mounted position in a liquid flow conduit and illustrating the valve in open position for testing the liquid flowing in the conduit.

Fig. 2 is a view similar to Fig. 1 but with the valve closed so that the conductivity cell is not immersed in the liquid.

Fig. 3 is a view taken on the line 3—3 of Fig. 1.

Fig. 4 is a view of the combination valve and conductivity cell in section, the valve being in open or projected position.

Fig. 5 is a view of the inner tubular member or valve sleeve removed from the housing.

Fig. 6 is a view taken on the line 6—6 of Fig. 2.

In the accompanying drawings I have used the numeral 1 to designate a union which is provided with an internally threaded outlet nipple or the like 3. The union 1 is adapted to be mounted in a liquid flow line through which the liquid to be tested flows. While for purposes of illustration I have disclosed the liquid to be tested as flowing in a conduit it is to be understood that it is within my contemplation to test liquid by my valve and conductivity cell which may be contained in a tank or the like suitable contianer and the liquid need not therefore be flowing. It is my intention that the use of the phrase "liquid flow conduit" in the specification includes a tank or the like as well as a pipe.

The combination valve and conductivity cell of this invention comprises a tubular housing designated in its entirety by the numeral 5 which may consist of a rear body section 7 and a forward externally threaded section 9. A circumferential collar 11 having wrench receiving flats is formed integral with or is otherwise provided on the housing 1. The housing is drilled or otherwise formed with a radial hole therein for receiving therein a screw, pin or key 13, the screw being of greater length than the thickness of the housing so that it will extend a distance into the interior of the housing as at 15 when the screw is substantially fully threaded into the housing. The screw is provided with a slotted head 17 so that its position in the housing may be easily adjusted.

I provide an inner tubular member or valve sleeve 19 of greater length than the length of the housing 1, and as will become apparent as this description proceeds the valve sleeve 19 is adapted to receive and carry a conductivity cell and to be reciprocably mounted within the housing 1. At its rear end the valve sleeve is externally threaded as at 21 and adjacent to but removed from its opposite or forward end the valve sleeve is provided with a circumferential series of apertures 23. While I have illustrated a double row of such aperture it is to be understood that any suitable arrangement of apertures may be followed and the structure will still fall within the spirit and scope of my invention. The forward end of the valve sleeve is closed as at 25 while the rear end of the valve sleeve is open. Between the closed end 25 of the sleeve and the apertures 23 therein I provide a circumferential groove 27 in which is positioned a rubber or the like sealing ring 29 and I provide a further circumferential groove 31 just rearwardly of the apertures 23 and in this I dispose a further sealing ring 33 of rubber or the like. An axially extending groove or keyway 35 is formed in the valve sleeve 19 and a circumferential groove or keyway 37 extends in one direction from the forward end of the groove 35 while a further circumferential groove or keyway 39 extends in the opposite direction from the opposite end of the groove 35. Consideration of the drawings illustrate that the two circumferential grooves are relatively short and that each of them opens into and is in communication with the main axial groove 35. For a reason to be hereinafter explained the length of slot 35 from the forward wall 41 thereof to the point 43 is substantially the same as the length of the forward portion of the valve sleeve, that is from the head 25 to the forward end of the groove 31.

As I have stated the valve sleeve mounts for reciprocation therewith a conductivity cell 45, the O.D. of which is slightly less than the I.D. of the valve sleeve so that the conductivity cell is received in the valve sleeve with a sliding fit. At its forward end the conductivity cell is provided with any suitable type of electrodes 47. Adjacent to but spaced from the rear end of the conductivity cell I fix a circumferential flange 49 having a forwardly directed lip 51 extending from its periphery to provide a recess for receiving a sealing ring 53 of rubber or the like material.

I provide a retainer nut 55 having an internal screw threaded portion 57 at its forward end and provided with an annular ring 59 which is maintained in position within the nut by means of a split ring 61 set in an internal groove in the nut. An electric cable 63 carries current into the cell and the end of the conductivity cell may be closed by a plug 65.

When the combination valve and conductivity cell is assembled the housing 1 is in position screwed into the union 1 in the conduit, the conductivity cell 45 is mounted in the valve sleeve 19 and the retainer nut 55 is threaded on the rear end of the housing until the ring 59 bears against flange 49 to push the cell inwardly to form a tight seal between sealing ring 53 and the rear end of the valve sleeve. With the conductivity cell so positioned in the valve sleeve the electrodes 47 will be positioned within that portion of the valve sleeve which is provided with the apertures. With the parts of the assembly in the described position and with the valve closed as illustrated in Fig. 2 of the drawings it may be opened by pushing the valve sleeve forwardly carrying the conductivity cell with it. When it is pushed forward the pin or screw 13 will ride in the slot 35 and when the rear wall of the slot is reached the operator will know the valve is in fully operative projected position as illustrated in Figs. 1 and 4 of the drawings and will then releasably lock it in operative position by giving a slight rotary movement in a clockwise direction to the valve sleeve whereupon the pin will ride into the slot 39. Thus it will be recognized that the valve sleeve may not be reciprocated to close the valve without first causing a slight rotary movement therein to again put the pin or screw into the main groove. When the valve is opened by projection of the valve sleeve it will be recognized that the liquid will flow through the apertures 23 so that the electrodes will be immersed in the liquid being tested.

When it is desired to close the valve for replacement or repair of the conductivity cell or for some other reason the valve sleeve is rotated in a counter clockwise direction until the pin is in the main groove whereupon the valve sleeve is pulled rearwardly with the pin riding in the slot. When the valve is closed and in retracted position as illustrated in Fig. 2 of the drawings the sealing ring 29 is received within the housing and simultaneously the pin will engage the forward wall of the slot whereupon the operator will know that the valve is closed and a slight rotary motion in a counter clockwise direction the valve will be releasably locked in closed position and the conductivity cell may then be removed and due to the sealing action of the rings 29 and 33 the liquid being tested cannot escape from the conduit or from the tank. To insure that the valve is fully closed and fully opened it is necessary that the distance from the point 41 to the point 43 equals the necessary throw or stroke to open and close the valve.

It will now be appreciated that I have provided a combination valve and conductivity cell assembly which is of simple construction and easy to operate by merely a push and pull action, that there are few moving parts to get out of order and that it may be operated by anyone with no particular skill being required. The locking operation is likewise of simple construction and insures against the accidental opening or closing of the valve.

I claim:

A valve assembly including a housing adapted to be mounted on and in communication with a liquid flow conduit containing a liquid to the tested, a tubular valve member reciprocably mounted in said housing for movement to retracted closed position and projected open position and adapted to mount therein in a conductivity cell and its electrical connections for reciprocation therewith, said tubular valve member being capable of limited rotation within the housing and means limiting the rotation thereof, and said tubular valve member having an axially extending keyway and relatively short circumferential keyways extending from and in communication with said axially extending keyway, one of said circumferential keyways extending in one direction from said axially extending keyway and the other of said circumferential keyways extending in the opposite direction, the entire forward portion of said tubular valve member having an external diameter providing a sliding fit within said housing and providing for rearward movement of the tubular valve member within the housing for its removal from the rear end thereof, and said means including a key removably mounted in said housing and extending into said axially extending keyway for guiding and limiting the reciprocal stroke of the tubular valve member and preventing rotation thereof and said key being slidable into said circumferential keyways to limit the rotational movement of said valve member and to lock the tubular valve member against reciprocation in projected open position and retracted closed position, said tubular valve member being non-rotatively slidable from said housing through the rear end thereof when said key is removed from its mounted position within the housing.

References Cited in the file of this patent
UNITED STATES PATENTS

| | | |
|---|---|---|
| 1,080,273 | Fountain | Dec. 2, 1913 |
| 2,234,056 | Moore | Mar. 4, 1941 |
| 2,713,989 | Bryant | July 26, 1955 |
| 2,810,879 | Cade et al. | Oct. 22, 1957 |
| 2,830,261 | Estelle | Apr. 8, 1958 |